United States Patent [19]
Khan et al.

[11] Patent Number: 5,703,989
[45] Date of Patent: Dec. 30, 1997

[54] SINGLE-MODE WAVEGUIDE STRUCTURE FOR OPTOELECTRONIC INTEGRATED CIRCUITS AND METHOD OF MAKING SAME

[75] Inventors: Mujibun Nisa Khan, Freehold; Jane Elisa Zucker, Aberdeen, both of N.J.

[73] Assignee: Lucent Technologies Inc., Murray Hill, N.J.

[21] Appl. No.: 580,915

[22] Filed: Dec. 29, 1995

[51] Int. Cl.$^6$ .................. G02B 6/10; H01L 21/70
[52] U.S. Cl. .................. 385/130; 385/14; 385/28; 385/129; 385/131; 437/51
[58] Field of Search .................. 385/14, 15, 28, 385/29, 49, 129, 130, 131, 132; 437/51, 129, 132, 225, 241

[56] References Cited

U.S. PATENT DOCUMENTS

| | | | |
|---|---|---|---|
| 5,078,516 | 1/1992 | Kapon et al. | 385/129 |
| 5,165,105 | 11/1992 | Haase et al. | 385/8 |
| 5,206,925 | 4/1993 | Nakazawa et al. | 385/142 |
| 5,237,639 | 8/1993 | Kato et al. | 385/131 |
| 5,278,926 | 1/1994 | Doussiere | 385/28 |
| 5,303,319 | 4/1994 | Ford et al. | 385/131 |
| 5,311,539 | 5/1994 | Behfar-Rad et al. | 372/96 |
| 5,319,727 | 6/1994 | Ford et al. | 385/30 |
| 5,468,689 | 11/1995 | Cunningham et al. | 437/121 |
| 5,490,226 | 2/1996 | Nelson | 385/16 |

OTHER PUBLICATIONS

*Large Singe–Mode Rib Waveguides in GeSi–Si and Si–on–-SiO2*, Richard A. Soref, et al., IEEE Journal of Quantum Electronics, vol. 27 No. 8, Aug. 1991, pp. 1971–1974.

*Antiresonant Reflecting Optical Waveguides in SiO$_2$–Si Multilayer Structures*, M. A. Duguay, et al., American Institute of Physics (1986), pp. 13–15.

*Antiresonant Reflecting Optical Waveguides For III–V Integrated Optics*, Koch, et al., Electronics Letters, Feb. 26, 1987, vol. 23 No. 5, pp. 244–245.

*Primary Examiner*—Brian Healy

[57] ABSTRACT

An optical waveguide for use in an optoelectronic integrated circuit and the associated method of manufacturing such a waveguide. The waveguide is formed by the successive layering of varied waveguide materials on a III–V semiconductor substrate, thereby producing a slab waveguide. The various layers within the slab waveguide are relatively thick, thereby producing a slab waveguide that is sized to be more compatible with an optical fiber and therefore more readily coupled to an optical fiber. The larger slab waveguide structure broadens the fundamental mode of the optical signal. However, multiple modes are also produced in the thicker slab waveguide that include higher order modes. A ridge structure is etched into the slab waveguide, wherein the width and height of the ridge structure are selected to impose lateral confinements on the higher order slab modes. The result is a waveguide that has a broadened fundamental mode yet is essentially single-mode. The resulting broadened fundamental mode is closer in symmetry to the mode of standard optical fibers, thereby enabling the waveguide to be more efficiently coupled to an optical fiber.

24 Claims, 3 Drawing Sheets

SINGLE-MODE WAVEGUIDE STRUCTURE FOR OPTOELECTRONIC INTEGRATED CIRCUITS AND METHOD OF MAKING SAME

BACKGROUND OF THE INVENTION

I. Field of the Invention

The present invention relates to waveguide structures for optoelectronic integrated circuits. More particularly, the present invention relates to waveguide structures for optoelectronic integrated circuits that have a high coupling efficiency with standard single-mode optical fibers.

II. Statement of the Prior Art

Since the successful continuous wave operation of semiconductor lasers, optoelectronic devices based on III–V semiconductors have been applied to an ever increasing number of applications. Discrete optoelectronic devices have subsequently become the key to optical telecommunications, data processing and sensing systems. To meet vast increases in information transmission and processing capacity, optoelectronic devices have to be improved to provide higher performance, particularly with regards to reliability and lower cost.

Optoelectronic integrated circuits are thin-film type integrated circuits that integrate multiple optical and electronic components on a single substrate. Through such integration, a more compact, stable and functional optoelectronic system can be produced. Optoelectronic integrated circuits typically integrate laser diode light sources, switches/modulators/couplers, interconnecting waveguides and photodiode detectors along with traditional electronic integrated components on a common substrate. The integration of lasers and photo detectors with other optical signal processing circuits by the use of waveguides produces useful components that embody advanced optical signal processing functions. The integration of waveguide devices in circuits using semiconductor and dielectric materials is typically referred to in the prior art as integrated optics or optical integrated circuits. More recent integration of various waveguide-based devices and optoelectronic conversion devices on a common semiconductor substrate is typically referred to in the prior art as photonic integrated circuits.

In optoelectronic integrated circuits that contain either optical integrated circuits or photonic integrated circuits, the integration schemes fully encompass existing device technology based on III–V semiconductors such as GaAs and InP compound systems. The materials most often used in optoelectronic integration are GaAs-based and InP-based III–V semiconductor material systems. The high electron mobility and drift velocity in these systems, together with their high-quantum efficiency heterostructures, provide a variety of advantages in optical and electronic device applications. Semi-insulating substrates made possible with these material systems are typically applied according to wavelength. For instance, InP-based systems are commonly used in optical transmissions due to low optical fiber loss at 1.3 micron and 1.55 micron wavelength windows. AlGaAs/GaAs systems, in contrast, are more commonly used in optoelectronic integration involving electronic circuits, due to its mature electronic device technologies.

The integration of optoelectronic devices with electronic circuits on a single substrate has many advantages. For instance, the integration of optoelectronic devices with electronic circuits on a chip reduces parasitic resistances that occur between electrical interconnections. furthermore, the number of fiber optic elements and interconnections can be reduced by monolithic integration of optoelectronic components. This enables integrated circuits to be manufactured with improved compactness as well as improved speed and noise characteristics. It is these very advantages that can make optoelectronic integrated circuits useful in very high-speed telecommunications and coherent optical telecommunications.

However, the use of optoelectronic integrated circuits has its own manufacturing and operating problems. A common problem associated with optoelectronic integrated circuits is junction signal loss at the junction where a traditional fiber optic element is joined to the substrate, via a waveguide fabricated within the substrate of the optoelectronic integrated circuit. Signal loss at such junctions is a two-fold problem caused by both facet reflection loss and substrate waveguide-to-fiber mode mismatch loss. The recent development of anti-reflection coatings on fiber optic element facets and waveguide facets have greatly reduced reflection losses caused by the coupling of these elements. As such, the vast majority of coupling junction losses are created by the mismatch in transmission modes between the waveguide in the optoelectronic integrated circuit substrate and the fiber optic element. The mode mismatch arises from the fact that the core/cladding index difference in conventional semiconductor waveguides is significantly higher than the core/cladding index difference in conventional single mode silica fibers and other fiber optic elements in similar materials. Furthermore, conventional single mode semiconductor waveguide modes are usually asymmetric and do not easily match the symmetrical mode configuration of standard optical fibers.

In the prior art, research has been conducted into ways to better match the modes of waveguides in optoelectronic integrated circuits with conventional fiber optic elements. To reduce coupling losses, waveguide mode sizes have to be more closely matched to the mode sizes of standard single mode fibers. This is generally difficult to achieve since semiconductor devices with large refractive index differences between core and cladding require the waveguide core dimensions to be small in order to exhibit single-mode behavior. One prior art approach used to better match waveguide modes to optical fiber modes is to add a passive adiabatic taper section to the waveguide. The taper section adiabatically expands the mode of the smaller single-mode waveguide to the larger size of the optical fiber. A disadvantage of such prior art mode matching techniques is that the use of taper sections can greatly increase fabrication complexity and the overall length of the waveguide, thereby acting against the trends of miniaturization.

Another approach used in the prior art to mode match semiconductor waveguides with optical fibers is the use of antiresonant reflecting cladding layers in the structure of the waveguide to create a large optical mode in a thick, low-index core. Such prior art techniques are exemplified by "Antiresonant Reflecting Optical Waveguides in $SiO_2$—Si Multilayer Structures" by Duguay et al., Appl. Phys. Lett. 49(1), 7 Jul., 1986 and "Antiresonant Reflecting Optical Waveguides For III–V Integrated Optics" by Koch et al., ELECTRONICS LETTERS Vol. 23, No. 5, Feb. 26, 1987. However, such prior art waveguides are multimode and are usually not well suited for many applications. Furthermore, for exact antiresonance in such prior art waveguide constructions, the reflective layers must be of exact thicknesses. As such, the disadvantages of such prior art methods include restrictions on the thickness of the antireflection layers, thereby preventing the field profile of the fundamental mode of the semiconductor waveguide from being broadened beyond the predetermined limits of the high index cladding layers. Such prior art techniques also require the crystal growth of thick epitaxial layers resulting in a sacrifice in modulation efficiency for active devices. Yet another approach used in the prior art to better match the modes of semiconductor waveguides to optical fibers has been the use of ridge waveguide structures to cause a multimode slab waveguide to produce a generally single-mode output. Such prior art is exemplified by "Large Single-Mode Rib Waveguides in GeSi—Si and Si-on-SiO$_2$", by Soref et al., IEEE JOURNAL OF QUANTUM ELECTRONICS, Vol. 27, No. 8, August 1991. A disadvantage of such prior art waveguide constructions is that the formation of a ridge waveguide in a conventional slab substrate only [alters the mode of the waveguide to be more like that of a fiber optic] allows for a larger overall mode diameter. However, the optical field profile of such prior art waveguide structures remain asymmetric as opposed to the radially symmetric optical model distribution of a standard single mode fiber. Hence, although the waveguide is single-mode, the field profile of the fundamental mode of the waveguide still differs substantially from the field profile of the mode of a conventional single mode fiber. As such, the coupling losses are reduced, but room still exists for far less coupling losses.

A need therefore exists in the art for a single mode waveguide structure with a field profile of the fundamental mode that more closely matches the field profile of a standard fiber, thereby enabling for higher waveguide-to-fiber coupling efficiencies.

SUMMARY OF THE INVENTION

The present invention is optical waveguide for use in an optoelectronic integrated circuit and the associated method of manufacturing such a waveguide. The waveguide is formed by the successive layering of varied waveguide materials on a III–V semiconductor substrate, thereby producing a slab waveguide. The various layers within the slab waveguide are relatively thick, thereby producing a slab waveguide that is sized to be more physically compatible with an optical fiber and therefore more readily coupled to an optical fiber. Unlike prior art multi-layer slave waveguides, the present invention waveguide has a core layer of a low index material that is sandwiched between two high index cladding layers. The three layer structure is then placed between two lower index cladding layers. The resulting larger slab waveguide structure broadens the fundamental mode of the optical signal. However, multiple modes are also produced in the thickened slab waveguide that include higher order modes. A ridge structure is etched into the slab waveguide, wherein the width and height of the ridge structure are selected to impose a lateral confinement, which causes higher order slab modes to disappear. The result is a waveguide that has a broadened fundamental mode and yet is essentially single-mode. The resulting broadened fundamental mode is closer in symmetry to the mode of standard optical fibers, thereby enabling the waveguide to be more efficiently coupled to an optical fiber.

In the preferred embodiment, the present invention waveguide includes an active core layer that is symmetrically interposed first between two high index cladding layers and then between two low index cladding layers. The index of refraction for the central active core layer is lower than that of the surrounding high index cladding layer and is essentially the same as the index of refraction for the low index cladding layers that surround the high index cladding layers. The bottom low index cladding layer lays on the base substrate, while the opposite top low index cladding layer is open to the air. The ridge structure used to impose lateral confinements on the higher order modes of the waveguide is formed by selectively etching the top low index cladding layer, the upper high index cladding layer and at least a portion of the active core layer. As a result, the ridge structure contains the top low index cladding layer, the upper high index cladding layer and at least a portion of the active core layer.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE PREFERRED EMBODIMENT

Figure 1:
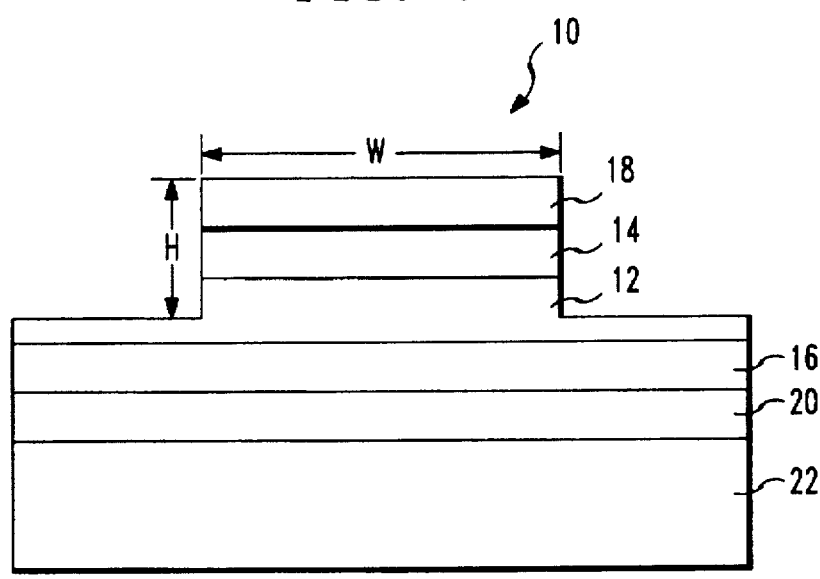
FIG. 1 is a cross-sectional view of one preferred embodiment of the present invention optical waveguide structure.

Referring to FIG. 1, a cross-section of the present invention waveguide structure 10 is shown. The waveguide structure 10 includes a low index active core layer 12 interposed between two high index cladding layers 14, 16 of uniform thickness and two superlattice or bulk low index cladding layers 18, 20 of uniform thickness. The waveguide structure 10 is formed upon a III–V semiconductor substrate 22. The waveguide structure 10 has the shape of a traditional ridge waveguide, wherein the ridge portion of the waveguide structure extends from the top superlattice or bulk low index cladding layer 18 down into the central active core layer 12.

The purpose of the present invention waveguide structure 10 is to produce a single-mode waveguide that is physically large enough to efficiently couple to a cleaved optical fiber. As will be shown, the mode size of the waveguide structure 10 is closely matched to the mode of an optical fiber to provide for low coupling losses. In the exemplary embodiment shown, the active core layer 12 has a barrier, reservoir and quantum well electron transfer (BRAQWET) structure that creates a large optical mode. The low index active core layer 12 is comprised of multiple BRAQWET repeats that create the active core. In the preferred embodiment, the low index active layer 12 is comprised of eleven or twelve BRAQWET repeats wherein each repeat is comprised of InGaAlAs, InAlAs and quantum well. The exemplary embodiment shows a low index active core layer 12 made of twelve BRAQWET repeats, wherein each repeat is comprised of 699 Å quantum well, 370 Å InGaAlAs and 260 Å InAlAs. As a result, the exemplary low index active core layer 12 has an overall refractive index of approximately 3.3199. However, in an alternate embodiment, it will be understood that the active core layer 12 could also be a simple bulk layer instead of the multiple BRAQWET layers described.

The high index cladding layers 14, 16 that surround the low index active core layer 12, have a substantially higher refractive index than does the low index active core layer 12. In the exemplary embodiment, each high index cladding layers 14, 16 is made of 1.1 eV InGaAlAs that is deposited approximately 3352 Å thick, thereby providing the high index cladding layers 14, 16 with a refractive index of approximately 3.346. The high index cladding layers 14, 16 are followed by the two superlattice or bulk low index cladding layers 18, 20. The superlattice or bulk low index cladding layers 18, 20 are constructed to have essentially the same index of refraction as does the low index active core layer 12. In the exemplary embodiment, the superlattice or bulk low index cladding layers 18, 20 are a 31-period (30 Å InAlAs/94 Å InGaAlAs) superlattice structure, wherein individual layer thicknesses were selected to provide an average refractive index equal to 3.3199, which is equivalent to that of the low index active core layer 12.

The fundamental waveguide of the overall waveguide structure 10 is designed to have a large optical field in the low index active core layer 12 that is comparable to the optical field in the high index cladding layers 14, 16. The field distribution of the fundamental mode and the higher order modes in the waveguide structure 10 enables the fundamental mode to be broadened and thereby provide better mode matching with conventional optical fibers.

The use of the low index active core layer 12, high index cladding layers 14, 16 and superlattice or bulk low index cladding layers 18, 20 in a simple slab waveguide produces a multi-mode slab waveguide. However, the present invention waveguide 10 is not a conventional slab waveguide. Rather, the present invention waveguide 10 is formed as a ridge waveguide. The ridge configuration of the waveguide is designed to impose lateral confinements that cut off the higher order slab modes. The suppression of higher order modes by the ridge configuration enables the fundamental mode in the waveguide structure 10 to be broadened. As large optical modes are created in the waveguide structure 10, secondary slab modes are produced in waveguide structure 10. The secondary slab modes are suppressed by the lateral confinements of the ridge structure, thereby resulting in only a broad single-mode. In the exemplary embodiment of FIG. 1, the ridge structure has a width W of approximately three microns and a height H of approximately 1.32 microns. Such a ridge waveguide structure 10 is single-mode near the wavelength of 1.55 µm for both the TE and TM polarizations. Single-mode characteristics can be maintained for ridge widths as large as 3.5 µm. Furthermore, since higher order modes are suppressed by the ridge structure, slab layer thicknesses can be increased, thereby increasing the overall size of the waveguide structure 10 and the efficiency by which the waveguide structure 10 can be joined to a single mode fiber.

Figure 2:
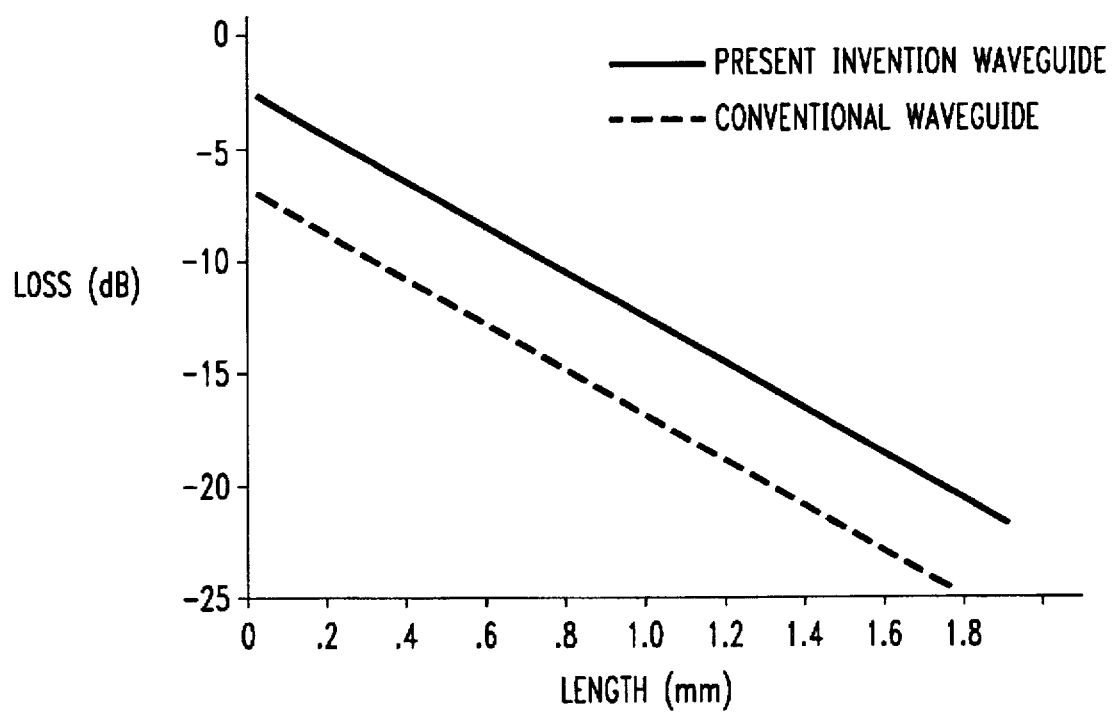
FIG. 2 is a graph illustrating the optical loss of one embodiment of the present invention optical waveguide structure as compared to a conventional optical waveguide structure.

Improved coupling efficiency can be seen by referring to FIG. 2. FIG. 2 shows coupling efficiencies for the present invention waveguide structure with a ridge structure that is 3 µm wide and 1.32 µm high. In FIG. 2, the measured transmission loss with lensed single-mode fibers is shown as a function of length for both a conventional waveguide structure and the present invention waveguide structure. For both a conventional waveguide structure and the present invention waveguide structure, the propagation loss is similar, ≈9.5 dB/mm. This propagation loss is anticipated from the electroabsorption spectrum which indicates a red-shifted zero-applied-voltage bandgap near 1.51 um. However, due to the increase in vertical mode size, the coupling loss for the present invention waveguide structure is only 1.65 dB/facet to a lensed fiber, as compared to 3.0 dB/facet for a conventional waveguide structure. In the case of a cleaved optical fiber, the present invention waveguide structure produces a loss of only 5.65 dB/facet as compared to 8.5 dB/facet for a conventional waveguide structure.

Figure 3:
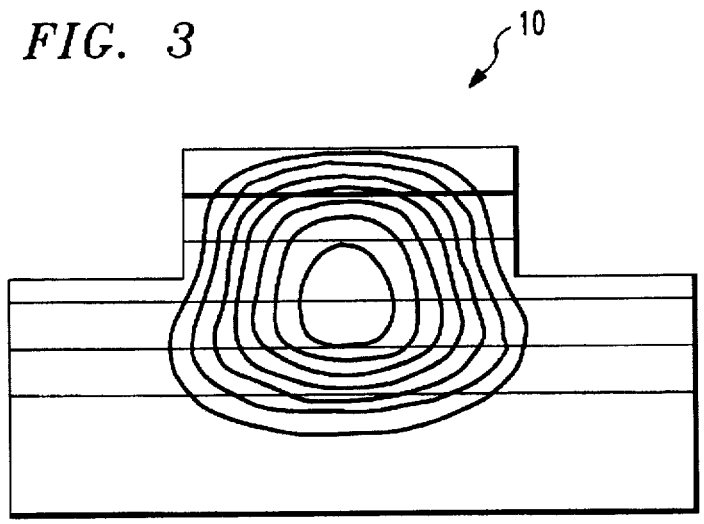
FIG. 3 shows calculated 2-D field contours for the embodiment of the present invention shown in FIG. 1, wherein the 2-D field contours are modelled using finite difference modelling.

Referring to FIG. 3, a plot of the 2-D fields obtained for the present invention waveguide structure 10, via finite-difference modelling is shown. As can be seen, the present invention waveguide structure 10 produces an expanded mode that is nearly symmetric and nearly approximates the mode of a circular optical fiber, thereby providing better mode matching with a conventional optical fiber.

Figure 4A:
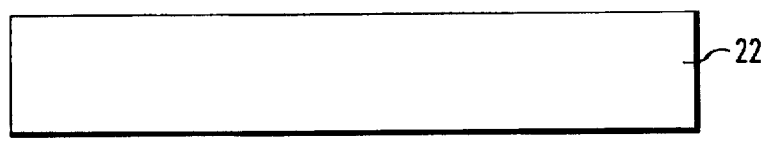
FIG. 4A–4F shows the various deposition and etching steps used in the preferred method for manufacturing of the embodiment of the present invention waveguide structure shown in FIG. 1.
Figure 4B:
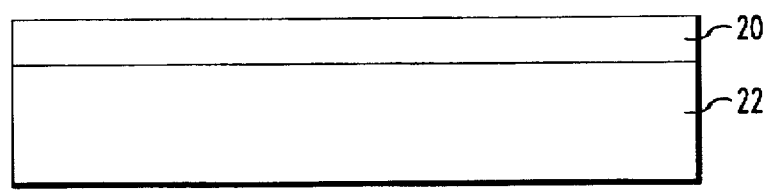
Figure 4C:
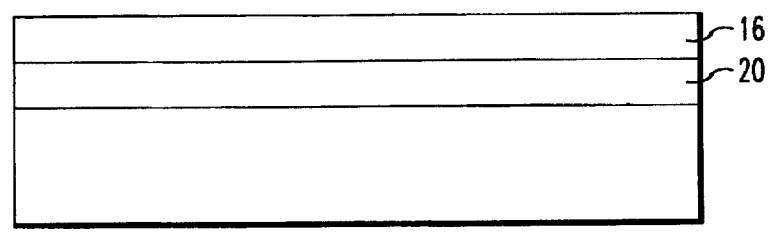
Figure 4D:
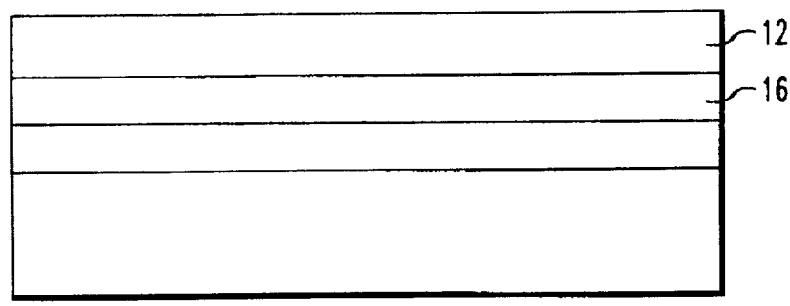
Figure 4E:
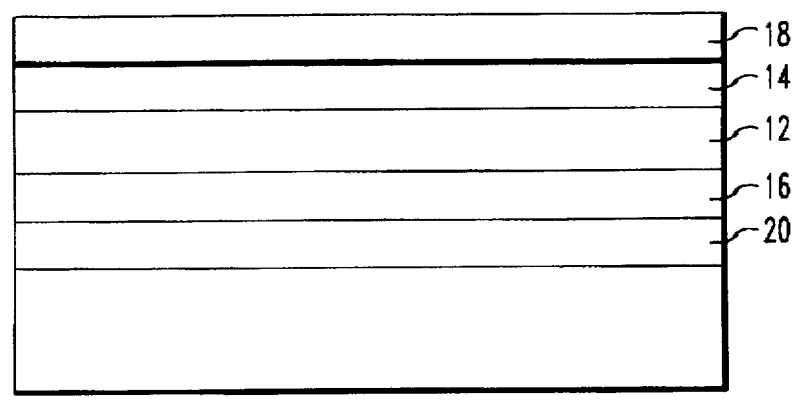

Referring to FIG. 4A, the first step in the method of manufacturing the present invention waveguide structure is shown, wherein the base substrate 22 is provided. In the embodiment of the present invention waveguide structure shown, the base substrate is an n-InP substrate having a thickness of at least 1.0 µm and a refractive index of approximately 3.17. Referring to FIG. 4B, it can be seen that the lower superlattice or bulk low index cladding layer 20 is deposited on the semiconductor base substrate 22. FIG. 4C shows the lower high index cladding layer 16 deposited onto the lower superlattice or bulk low index cladding layer 20. FIG. 4D shows the low index active core layer 12 deposited upon the lower high index cladding layer 16. The low index active core layer 12 is then capped with an upper high index cladding layer 14 that is identical to the lower high index cladding layer 16 and an upper superlattice or bulk low index layer 18 that is identical to the lower superlattice or bulk low index cladding layer 20, as is shown in FIG. 4E. Each layer of the waveguide structure 10 is deposited using an epitaxial growth technique such as liquid-phase epitaxy, molecular beam epitaxy, metal-organic vapor-phase epitaxy or metal-organic molecular beam epitaxy.

Figure 4F:
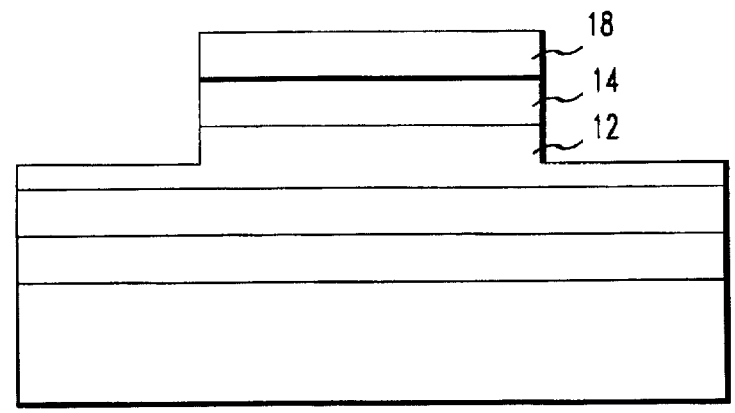

Referring to FIG. 4F, it can be seen that after all the layers of the waveguide structure are deposited, the resulting slab is then etched to produce the ridge structure. The slab can be wet-etched, however, to prevent mask undercutting and to ensure accurate etching dimensions, the slab is preferably dry-etched using reactive-ion-beam etching or reactive-ion etching. Regardless of the etching technique used, the upper superlattice or bulk low index cladding layer 18 and the upper high index cladding layer 14 are etched away on either side of the ridge structure. Furthermore, between 70% and 90% of the core low index active layer 12 is etched away. The depth of the etch is determined by the performance characteristics of the waveguide and the higher-mode suppression characteristics to be embodied by the ridge structure of the waveguide.

It will be understood that the dimensions used within the above description are exemplary and a person skilled in the art can change such dimensions for the needs of a given application. Furthermore, alternate materials for the low index active core layer, [reflective] high index cladding layers and superlattice or bulk low index cladding layers may also be used. All such alternate embodiments and modifications are intended to be included within the scope of the present invention as defined by the appended claims.

What is claimed:

1. An optical waveguide, disposed on a substrate, comprising:
   a core layer having a first index of refraction;
   a first reflective high index cladding layer and a second reflective high index cladding layer bounding said core layer, wherein said core layer is interposed between said first reflective high index cladding layer and said second reflective high index cladding layer, said first reflective high index cladding layer and said second reflective high index cladding layer having a common second index of refraction that is greater than said first index of refraction;

a first low index cladding layer and a second low index cladding layer bounding said first and second reflective high index cladding layer, wherein said first reflective high index cladding layer and said second reflective high index cladding layer are interposed between said first and second low index cladding layer, said first low index cladding layer and said second low index cladding layer having a common third index of refraction that is less than said second index of refraction;

wherein said optical waveguide includes a ridge structure that contains said first low index cladding layer, said first reflective high index cladding layer and at least a portion of said core layer therein, said ridge structure being sized to impose lateral confinement for suppressing higher order slab modes and producing an essentially single-mode optical waveguide structure.

2. The waveguide according to claim 1, wherein said first index of refraction is substantially equivalent to said third index of refraction.

3. The waveguide according to claim 1, wherein said first reflective cladding layer and said second reflective high index cladding layer have a layer thickness that is substantially equivalent.

4. The waveguide according to claim 1, wherein said first low index cladding layer and said second low index cladding layer have a layer thickness that is substantially equivalent.

5. The waveguide according to claim 1, wherein said core layer is symmetrically clad first by said first and second reflective high index cladding layer and then by said first and second low index cladding layer.

6. The waveguide according to claim 1, wherein said core layer includes multiple BRAQWET repeats.

7. The waveguide according to claim 1, wherein said first reflective high index cladding layer and said second reflective high index cladding layer contain InGaAlAs.

8. The waveguide according to claim 1, wherein said substrate includes n-InP.

9. The waveguide according to claim 1, wherein said first low index cladding layer and said second low index cladding layer are superlattice layers that contain InAlAs and InGaAlAs.

10. The waveguide according to claim 1, wherein said ridge structure has a width of approximately 3μm and a height of approximately 1.3μm.

11. A method of manufacturing an optical waveguide on a substrate, comprising the steps of:

depositing a first low index cladding layer on said substrate, having a first index of refraction;

depositing a first reflective high index cladding layer on said first low index cladding layer, having a second index of refraction;

depositing a core layer on said first reflective high index cladding layer, having a third index of refraction;

depositing a second reflective high index cladding layer on said core layer, having an index of refraction substantially equivalent to said first reflective high index cladding layer;

depositing a second low index cladding layer on said second reflective high index cladding layer, having an index of refraction substantially equivalent to said first low index cladding layer; and selectively etching said second low index cladding layer, said second reflective high index cladding layer and at least a portion of said core layer to produce a ridge structure, said ridge structure being sized to impose lateral confinement for suppressing higher order slab modes and producing an essentially single-mode optical waveguide structure.

12. The method according to claim 11, wherein said first index of refraction is substantially equivalent to said third index of refraction.

13. The method according to claim 11, wherein said first reflective high index cladding layer and said second reflective high index cladding layer have a layer thickness that is substantially equivalent.

14. The method according to claim 11, wherein said first low index cladding layer and said second low index cladding layer have a layer thickness that is substantially equivalent.

15. The method according to claim 11, said step of depositing said core layer includes depositing multiple BRAQWET repeats in successive layers.

16. The method according to claim 11, wherein said first reflective high index cladding layer and said second reflective high index cladding layer are deposited at substantially equal thicknesses.

17. The method according to claim 11, wherein said first low index cladding layer and said second low index cladding layer are deposited at substantially equal thicknesses.

18. A method of manufacturing an integrated waveguide structure capable of being efficiently coupled to a fiber optic of a predetermined size, comprising the steps of:

forming a slab waveguide containing a plurality of layers, wherein said slab waveguide produces multiple slab modes that include higher order slab modes; and forming a ridge structure in said slab waveguide, wherein said ridge structure has a predetermined height and width that impose lateral confinement to said multiple slab modes, thereby suppressing said higher order slab modes and producing an essentially single-mode waveguide structure having a size that generally corresponds to the predetermined size of the fiber optic.

19. The method according to claim 18, wherein said step of forming a ridge structure includes the substeps of:

depositing a first low index cladding layer on said substrate, having a first index of refraction;

depositing a first high index cladding layer on said first low index cladding layer, having a second index of refraction;

depositing a core layer on said first high index cladding layer, having a third index of refraction;

depositing a second high index cladding layer on said core layer, having an index of refraction substantially equivalent to said first high index cladding layer; and depositing a second low index cladding layer on said second high index cladding layer having an index of refraction substantially equivalent to said first low index cladding layer.

20. The method according to claim 18, wherein said step of forming a ridge structure in said slab waveguide includes etching said second low index cladding layer, said second high index cladding layer and at least a portion of said core layer.

21. An optical waveguide, comprising: a core layer;

a first reflective cladding layer and a second reflective cladding layer bounding said core layer, wherein said first reflective cladding layer and said second reflective cladding layer have indices of refraction greater than that of said core layer;

wherein said optical waveguide includes a ridge structure that contains said first reflective cladding layer and at least a portion of said core layer therein, said ridge structure being sized to impose lateral confinement for suppressing higher order slab modes and producing an essentially single-mode optical waveguide structure.

22. The waveguide according to claim 21, further including at least one subsequent cladding layer bounding said first reflective cladding layer and said second reflective cladding layer, wherein said at least one subsequent cladding layers has an index of refraction that is lower than those of said first reflective cladding layer and said second reflective cladding layer.

23. The waveguide according to claim 22, wherein said core layer is symmetrically clad between said first reflective cladding layer and said second reflective cladding layer.

24. The waveguide according to claim 23, wherein said first reflective cladding layer and said second reflective cladding layer have indices of refraction that are substantially equal.

* * * * *